United States Patent [19]

Boucher et al.

[11] 3,860,767

[45] Jan. 14, 1975

[54] VOICE FREQUENCY REPEATER

[75] Inventors: C. Wendell Boucher, Huntington Beach; Thomas W. Hanneman, Fountain Valley, both of Calif.

[73] Assignees: Jim C. Garrett, Long Beach; Robert H. Johnson, Marina Del Rey; Jack Shelton, Long Beach, all of Calif.; part interest to each

[22] Filed: Sept. 26, 1972

[21] Appl. No.: 292,303

[52] U.S. Cl. ................................ 179/170 G, 178/45

[51] Int. Cl. ........................... H04b 3/18, H04b 3/40

[58] Field of Search ........ 178/45, 71 H; 179/170 G; 333/23

[56] References Cited

UNITED STATES PATENTS

| | | | |
|---|---|---|---|
| 2,232,642 | 2/1941 | Shaw | 178/45 |
| 2,957,944 | 10/1960 | De Monte | 178/45 |
| 2,963,558 | 12/1960 | Cerofolini | 179/170 G |
| 2,978,542 | 4/1961 | Huxtable | 178/45 |
| 2,998,581 | 8/1961 | Dimmer | 179/170 G |
| 3,024,324 | 3/1962 | Dimmer | 179/170 G |
| 3,042,759 | 7/1962 | Bonner | 179/170 G |
| 3,135,930 | 6/1964 | De Monte | 333/23 |
| 3,303,437 | 2/1967 | De Monte | 179/170 G |

*Primary Examiner*—William C. Cooper
*Assistant Examiner*—Randall P. Myers
*Attorney, Agent, or Firm*—Albert L. Gabriel

[57] ABSTRACT

A negative impedance repeater gain unit connected to a pair of line build-out matching networks. The gain unit includes a shunt converter and a series converter, each having a plurality of amplifying transistors therein. A portion of the biasing circuit for the transistors is common to both converters, and zener diodes are used for transistor protection. The line build-out matching network includes: a low-frequency corrector having a fixed capacitance, together with resistance and inductance elements switched in and out of the corrector circuit; a high-frequency corrector having a capacitance which can be switched in and out of the corrector circuit depending upon the intended loading; a plurality of build-out capacitance and resistance elements transformed into the output circuit. The entire device is mounted on a panel board.

16 Claims, 6 Drawing Figures

VOICE FREQUENCY REPEATER

BACKGROUND

The present invention relates to an improved negative impedance repeater, and more particularly to a negative impedance converter gain unit and its associated line build-out matching networks used in conjunction with a loaded telephone transmission line.

Since the early development of amplifier systems designed to transmit in both directions, it has been a continual goal to increase the quality of the transmitted signal. Some of the earliest repeater circuits designed to transmit in two directions employed vacuum tube repeater elements and included a pair of three winding transformers termed hybrid coils.

An improved and transistorized negative impedance repeater, or hybrid coil repeater, is exemplified by U.S. Pat. No. 3,042,759 to Bonner. Reference is specifically made to the introductory portion of this patent which gives considerable background information relative to the employment of negative impedance converters. Also, the improvements set out herein will be more appreciated by periodic references to the Bonner patent.

The overall effectiveness of a repeater system is also dependent upon the networks used to match the negative impedance repeater gain unit to the transmission lines. Prior art matching networks are exemplified by DeMonte, U.S. Pat. No. 2,957,944 and Huxtable, U.S. Pat. No. 2,978,542.

SUMMARY

It is an object of the instant invention to provide a negative impedance repeater which possesses better operating characteristics than the prior art. Specific operating characteristics which are improved is a higher return loss over a wide range of frequencies and the ability to transmit over the entire range of voice frequencies without any "singing".

Another object of the invention is to provide a negative impedance repeater which can be more easily and quickly adjusted than is the case with the prior art.

An object of the invention is to provide protection against lightning and other surges.

Still another object of the invention is to provide a smaller and more compact repeater wherein the volume of elements is greatly reduced by providing a number of elements in the series converter and in the shunt converter packaged in two integrated circuits (ICs). Also, size and weight compactness is achieved by the elimination of certain elements.

Another object is to provide a line build-out matching network which is easier to adjust than that of the prior art and has a superior operating performance.

Another object of the invention is to provide a matching circuit which can be utilized with cables ranging in size from 19 to 26 gauge cable, as well as D-66 and H-88 loading.

The invention includes a negative impedance repeater gain unit and a pair of line build-out matching networks. The gain unit includes a series converter and a shunt converter each in an IC package. Elements common to both converters are contained in the series IC package. The series and shunt converters are connected to the transmission lines via a three-winding hybrid coil. One winding of the hybrid coil is connected to two pair of push-pull amplifier transistors which are protected by zener diodes against lightning or other voltage surges. The gain of the converter is varied by a plurality of ball switch-connected resistors, while the high alternating current impedance collector voltage supply is obtained by a center tapped inductor connected in parallel across the variable resistors. This inductor through converter action increases the apparent inductance of the line transformer which optimally should be a so-called "ideal" transformer. A pair of coupling capacitors provide positive feedback circuit paths in the base-collector circuits of the transistor pairs to achieve the necessary converter operation. A number of the biasing resistors contained in the series converter IC package also bias the transistors in the shunt converter.

The shunt converter has two pair of push-pull amplifier transistors connected to the remaining windings of the three-winding hybrid coil. The transistor pairs also have zener diodes in their emitter-collector circuits for protection. Positive feedback in the shunt converter is provided by a step-up transformer. A capacitor in series with a plurality of ball switch-resistors may, if desired, be utilized to improve the return loss performance (depending on economic considerations) and permits the obtaining of the phase shift required to achieve the return loss target.

The line build-out matching networks include a low-frequency corrector having a shunt circuit including a fixed capacitor, together with a plurality of resistors and inductors which may be switched in and out of the circuit to vary the resistance and inductance respectively. A high frequency corrector includes a fixed resistance and variable resistance in parallel with both a first fixed capacitance and a second capacitance which may be switched in and out of the circuit. The high-frequency corrector is coupled to a three-winding transformer which has a plurality of build-out resistances and a plurality of build-out capacitors which may be switched in and out of the circuit. The gain unit and the matching networks are each mounted on panel boards in a compact array.

BRIEF DESCRIPTION OF THE DRAWINGS

The above and other objects of the invention will readily become apparent from a detailed description set out below and in accompanying drawings wherein.

DETAILED DESCRIPTION OF THE INVENTION

Overall System

Figure 1:
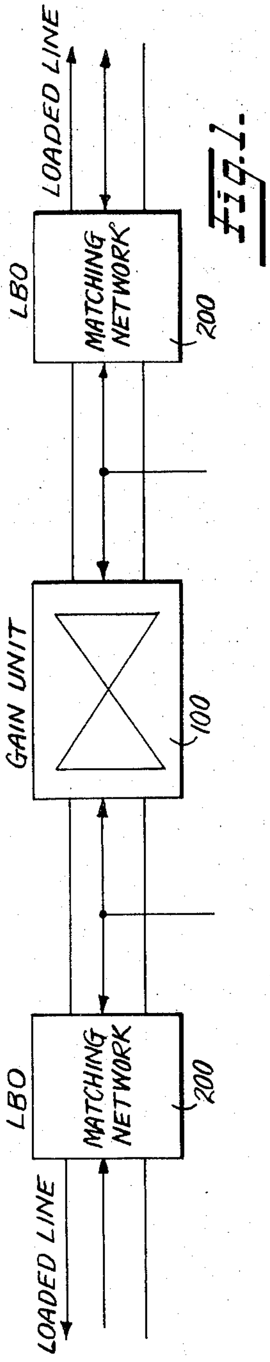
FIG. 1 is a schematic diagram in block form illustrating a negative impedance repeater gain unit in accordance with the invention, together with two associated line build-out matching networks and loaded transmission lines.

FIG. 1 illustrates a gain unit 100 connected to a pair of loaded lines going to and/or from a control office and an ultimate load, together with a pair of line buildout matching networks 200. The networks 200 are designed to build-out or match the complex impedance of the loaded line to the simplified impedance of about 900 ohms and 2 microfarads of the wide band voice frequency gain unit to avoid reflection which may cause singing.

Gain Unit

Figure 2:
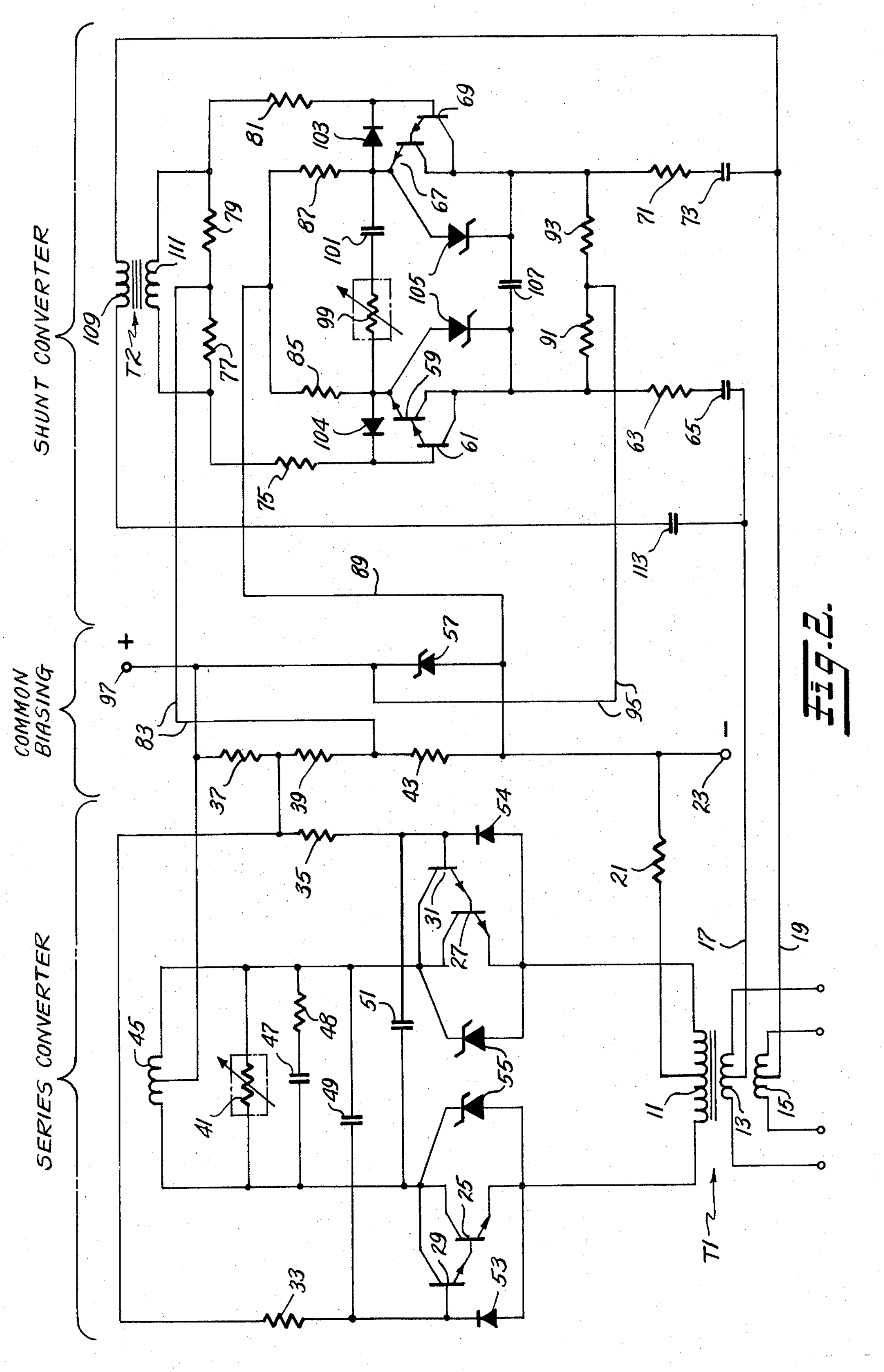
FIG. 2 is a schematic diagram of a negative impedance repeater gain unit in accordance with the invention.

Referring now to FIG. 2 illustrating the negative impedance repeater gain unit 100 shown in FIG. 1, a series converter is illustrated at the left and a shunt converter at the right, each in an IC package. The sections are coupled to the incoming and outgoing transmission lines by a transformer or hybrid coil T1. The series converter is connected to a winding 11 of transformer T1, while the shunt converter is connected through a pair of windings 13 and 15. A pair of center tap lines 17 and 19 connect the shunt converter to the midpoints of the windings 13 and 15 respectively.

Series Converter

The series converter winding 11 has a center tap connection through a resistor 21 to a negative potential terminal 23. The ends of the series converter winding 11 are connected to emitter electrodes of a pair of push-pull amplifier n–p–n transistors 25 and 27. The base electrodes of transistors 25 and 27 are connected directly to the emitter electrodes of a second pair of push-pull amplifier n–p–n transistors 29 and 31 respectively. Transistors 25 and 29 may be a single Darlington transistor configuration. The same comment applies to transistors 27 and 31, 59 and 61, and 67 and 69. The collectors of paired transistors 25 and 29 are connected together, as are the collectors of transistors 27 and 31. The base electrodes of transistors 29 and 31 are respectively connected together through a pair of biasing resistors 33 and 35, while biasing resistors 37, 43 and 39 form a biasing voltage divider. The gain of the series converter is set by a variable resistor 41 which in actuality is a plurality of ball switch-connected resistors illustrated in co-pending application Ser. No. 279,863, filed Aug. 11, 1972.

It should be noted here that voltage divider 37 and 39, together with a resistor 43 form part of a bias circuit. They not only bias the transistors 25–31, but also bias a plurality of shunt converter transistors as will be seen below.

With the use of the ball switch adjustable resistors of the above mentioned co-pending application, it is possible to adjust the gain in about five to ten seconds, as opposed to about two minutes with prior art devices.

The provision of a high-alternating current impedance collector voltage supply for the transistors is accomplished by a center tapped inductor 45 connected in parallel across the variable resistors 41. Also in parallel with the resistors 41 and the inductor 45 is a capacitor-resistor network 47 and 48. As discussed in the Bonner patent, the total parallel impedance of inductor 45, resistors 41 and the capacitor-resistor network 47 and 48 is held below the level of the impedance looking into transformer winding 11, thereby preserving stability against self-oscillation in the series converter.

A pair of coupling capacitors 49 and 51 provide positive feedback circuit paths in the base-collector circuits of the transistor pairs necessary for converter operation.

A diode 53 is positioned in the circuit between the base of transistor 29 and the emitter of transistor 25. Similarly, a diode 54 is connected in the circuit between the base of transistor 31 and the emitter of transistor 27. Connected in shunt across each of the transistors 25 and 27 is a zener diode 55. The zener diodes and other diodes provide a built-in protection against voltage surges from lightning or the like.

In operation the current flowing into the pairs of transistors 25, 29 and 27, 31 in the series converter flows out of the collector electrodes into the variable resistors 41. The voltage is cross-coupled by capacitors 49 and 51 back to the base electrodes of the transistors and from there to the "out" terminals. This voltage is substantially the negative of the voltage across resistors 41 and the impedance presented at the converter terminals is the negative of the resistance of resistors 41.

Zener diode 55 protects the system against DC supply over-voltage or improper application of reverse DC supply voltage. The various zener and other diodes will provide lightning protection against 600 volts for 1 millisecond. This will provide better surge protection and lightning protection than that which has been available in prior art repeaters. The only time the zener diodes, except for 55, come into play is if the collector-to-emitter voltage ratings of the transistors are about to be exceeded. The diodes protect the transistors against excessive backward emitter-to-base voltage.

Shunt Converter

Referring now to the shunt converter on the right-hand portion of FIG. 2, a first pair of push-pull amplifier transistors 59 and 61 are connected via their joined collectors through a resistance 63 and capacitance 65 to the center tap of winding 13 via line 17. A second pair of push-pull amplifier transistors 67 and 69 are connected through a resistor 71 and a capacitor 73 to the center tap of winding 15 via line 19. The collectors of transistors 67 and 69 are connected in the same manner as transistors 59 and 61. The emitter of transistor 61 is connected to the base of transistor 59, as is the emitter of transistor 69 to the base of transistor 67. The bases of transistors 61 and 69 are connected through resistors 75, 77, 79 and 81. These resistors, together with the common biasing resistors 37, 39 and 43, provide the bias for the shunt converter transistors. Also, resistors 75 and 81 provide current surge limiting protection for the bases of transistors 61 and 69. The junction between resistors 77 and 79 is connected via a line 83 to the negative potential terminal 23 through the bias resistor 43.

The emitters of transistors 59 and 67 are connected through a pair of resistors 85 and 87. The junction between these two resistors is connected via a line 89 directly to the negative terminal 23. Resistors 85 and 87 complete the emitter biasing circuit for transistors 59 and 67, while a pair of resistors 91 and 93 connecting the collectors of the pairs of transistors complete the collector current supply for all of the transistors in the shunt circuit via a line 95 to the positive potential terminal 97. Again, the zener diode 55 is positioned across the two potential terminals 23 and 97.

A variable terminating resistance 99 in the form of a plurality of ball switch-resistor combinations of the type referred to relative to resistors 41, together with a capacitor 101 bridge the emitter-connecting circuits between transistors 59 and 67. A diode 103 provides base-emitter protection for transistors 67 and 69 and similarly diode 104 protects transistors 59 and 61. A pair of emitter-collector protection zener diodes 105 are connected across the emitter-collector circuits of each pair of transistors. A capacitor 107 is positioned in parallel across resistors 91 and 93 to provide phase stability.

A second transformer T2 having windings 109 and 111 is used to provide the positive feedback in the shunt converter Transformer T2 which is a step-up transformer is utilized in place of two transformers in the prior art. A first winding 109 is connected in the circuit between lines 17 and 19 and includes a capacitor 113. A second winding 111 is positioned across resistors 77 and 79. By removing one of the transformers from the prior art device and reducing the inductance in the line windings of transformer T1, the size of the overall device can be reduced.

Resistors 21, 63, and 71, together with capacitors 65 and 73, provide the phase-shifting network for the shunt converter. Resistors 21, 63 and 71 act as current limiters in the network. Capacitor 101 is utilized to improve the return loss performance and permits the obtaining of the phase shift required to achieve the return loss target over a range of gain adjustment. Further, the instant construction significantly improves the phase shift tracking as the gain of the converter unit is varied throughout its range.

From the above, it is seen that the simplified circuit will provide a much smaller size device requiring fewer components. Specifically, it will reduce the size and weight in the order of four to one over prior art type devices. This advantage is also achieved by the use of integrated circuits as opposed to the prior art circuits which utilize discrete components for both the series converter and the shunt converter. Finally, the instant converter provides improved return loss performance as indicated above.

Line Build-Out Matching Network (LBO)

Figure 3:
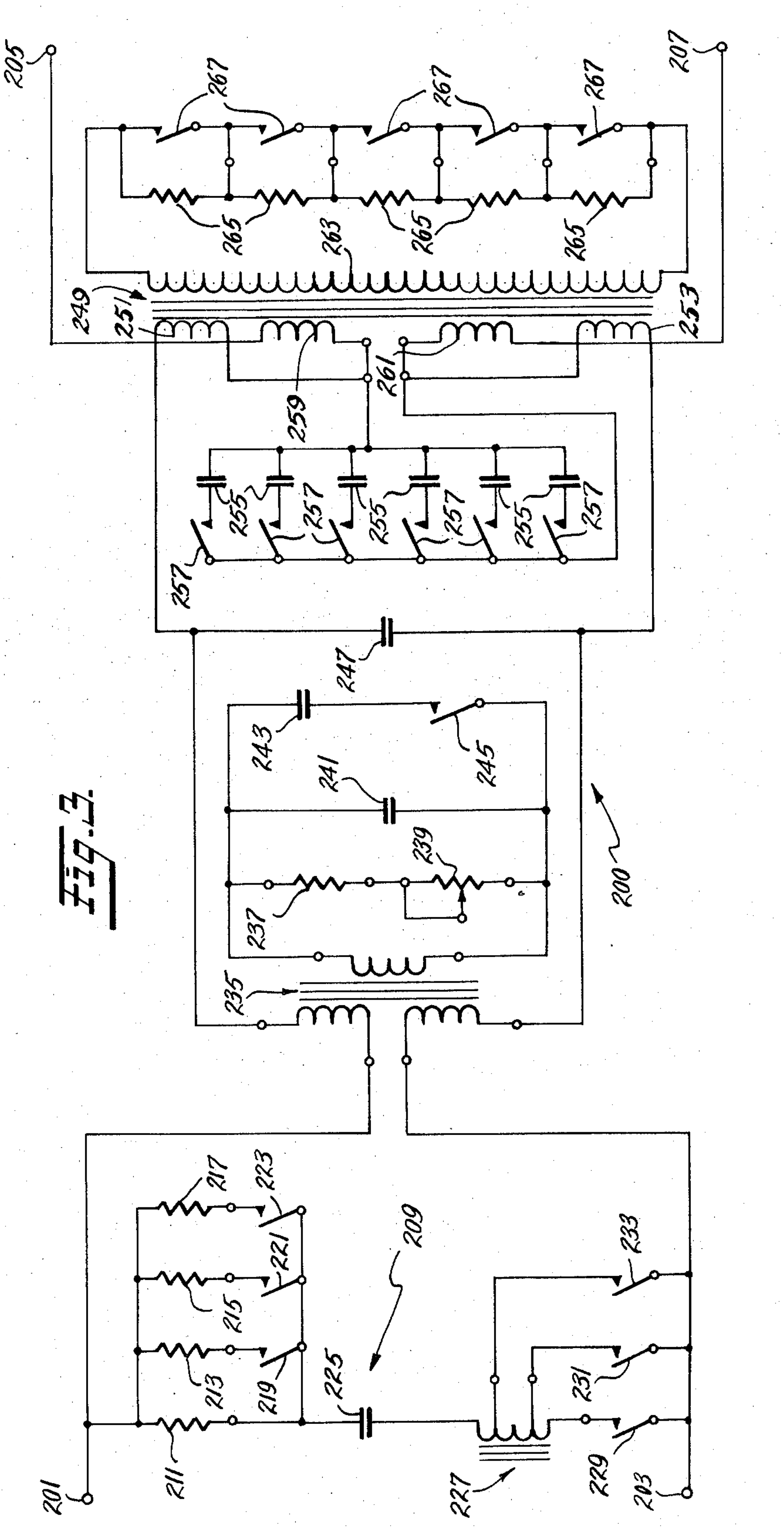
FIG. 3 is a schematic diagram of a line build-out (LBO) network for matching a transmission line to a repeater gain unit.

Reference is now made to FIG. 3 which illustrates the impedance matching or line build-out units which are used on each side of the negative impedance gain unit of FIG. 2 for connection to the loaded transmission lines. Essentially, this network comprises a plurality of groups of resistors and capacitors with appropriate switching means for inserting or removing the elements from the associated line to provide the proper matching. The specific purpose of the instant line build-out unit is to convert the complex impedance of the telephone lines to the relatively simple impedance of about 900 ohms and 2 microfarad capacitance seen at the gain unit terminals over the frequency range of 300 Hz to 3,000 Hz. Reference may be made to the DeMonte and Huxtable patents for additional background material in this area.

A pair of terminals 201 and 203 may be considered the gain unit terminals while a pair of terminals 205 and 207 may be considered the line terminals.

A low frequency corrector in the form of circuit 209 is connected in shunt across terminals 201 and 203. A variable resistance may be introduced into the corrector circuit by a plurality of resistance elements 211, 213, 215 and 217. Resistance 211 always remains in the line, while parallel resistances 213–217 may be added by means of switches 219, 221 and 223. A capacitor 225 also always remains in the line and is not variable. Since it has been found that the value of the capacitance is not very critical, a considerable amount of time can be saved by only having to adjust two values, as opposed to three. A variable inductance 227 includes tapped portions which may be inserted or removed from the circuit by means of switches 229, 231 and 233.

A distinction over the prior art patent to DeMonte, for example, is that the instant circuit utilizes a constant capacitance represented by capacitor 225. It has been found that the above arrangement, whereby the capacitance is not varied, produces superior results over the prior art.

The low frequency corrector section of the network is coupled to a high frequency corrector section by means of a transformer 235. The high frequency section includes a fixed resistor 237 and a variable resistance 239. It also includes a fixed capacitor 241 in parallel with the resistance elements, together with another parallel capacitor 243 which may be removed or added to the circuit by means of switch 245. The high frequency corrector section is coupled directly to a winding of a three-winding build-out transformer 249. This first winding includes a pair of coils 251 and 253 connected to an adjustable capacitance including a plurality of capacitors 255 inserted into the circuit via a plurality of switches 257. A middle winding including a pair of coils 259 and 261 is connected to the output terminals 205 and 207. A third winding 263 is connected to a variable resistance comprised of a plurality of elements 265 which are inserted into the circuit by means of a plurality of switches 267. The purpose of all multiple adjustments is to convert the impedance of the incoming or outgoing transmission line to approximately 900 ohms in series with 2 microfarads. Depending upon the distance from the repeater to the first loading coil on the line, the values of the building-out capacitors 255 and the values of the building-out resistors 265 may be adjusted by the operation of the corresponding switches. Capacitor 247 is part of the line build-out circuit. The switching means used for the binary array of switches 267 is illustrated in co-pending application Ser. No. 279,863, filed Aug. 11, 1972 referred to above in connection with variable resistors 41 and 99.

The prior art represented for example by DeMonte, utilized a pair of adjustable resistors, one each in the output lines. These resistors in effect build out the center frequency. The instant invention does not utilize such adjustable resistors in the line. Instead, it transforms resistors 265 into the circuit. While DeMonte, for example, might be said to add loop resistance, the build-out resistance in the instant application is independent of the DC loop resistance. An advantage over the prior art is achieved because in devices such as DeMonte, when one physically adds the resistance directly to the line, an impairment to the DC signaling is obtained in order to improve the transmission. Therefore, this trade-off or compromise does not exist with the circuit of the instant invention. Capacitor 247, not present in the prior art, further improves performance. It will further be appreciated that the high frequency corrector of DeMonte is a fixed, series R-C network; whereas, the instant circuit is in parallel and is adjustable.

The build-out resistance 265 and the build-out capacitors 255 and 247 form a pseudo "Campbell Section", i.e., the device will closely approximate a real line section.

Switch 245 in the high-frequency corrector is closed for H-88 loading and open for D-66 loading. (D-66 loading is 4,500 feet spacing and 66 millihenry coils, while H-88 loading is 6,000 foot spacing and 88 millihenry coils). The ability to handle D-66 loading, which has a slightly improved high frequency performance over H-88 (that is, a little wider bandwidth), is not possible with the prior art of DeMonte.

It has been found that the instant device will function well on cables of 19, 22, 24 and 26 gauge, as well as end section mixtures of the above. Therefore, the instant invention has the advantage over the prior art in that it will work with 26 gauge cable, and work well. Further, it has been found that the length of the cable within the confines of the respective spacings of D-66 and H-88 is not critical. Therefore, the end length can be from 0–4,500 feet or 0–6,000 feet as the case may be.

Figure 4:
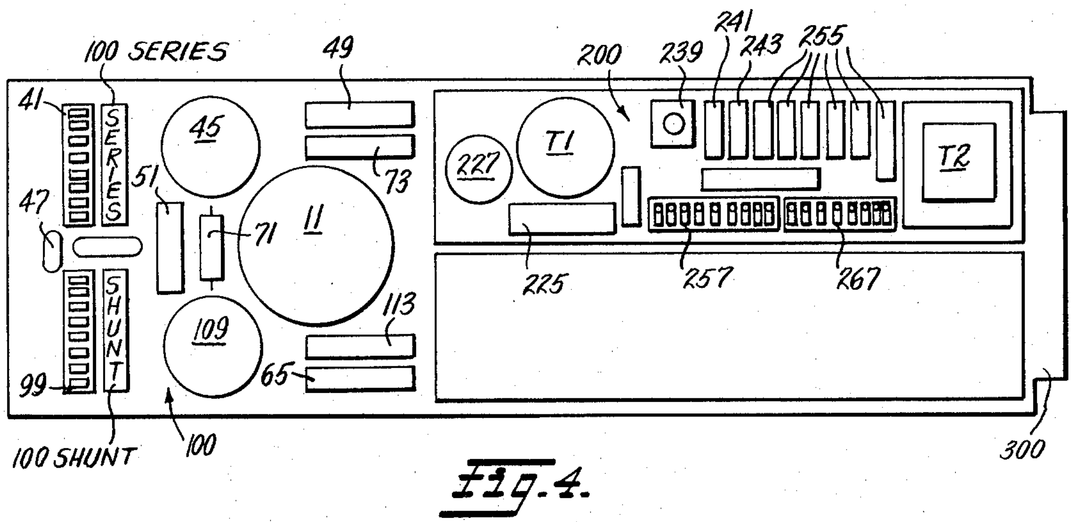
FIG. 4 is a diagram of the assembly of the gain unit and network components on equipment panels.

FIG. 4 illustrates the compactness of the unit. The negative impedance repeater gain units are seen at 100, while the two line build-out matching networks are seen at 200. These are mounted on a frame 300. The instant design will permit seventeen such units on a 23-inch shelf. All of the elements are numbered as they appear in the circuit diagrams of FIGS. 1–3. It will be appreciated that many of the elements of FIGS. 1–3 do not appear in FIG. 4. This is because the remainder of the elements of the series and shunt converters (except for some conductors which are "printed" on the back of the panel) are integrated circuits in blocks "100 Series" and "100 Shunt" respectively.

PERFORMANCE CHARACTERISTICS

Figure 5:
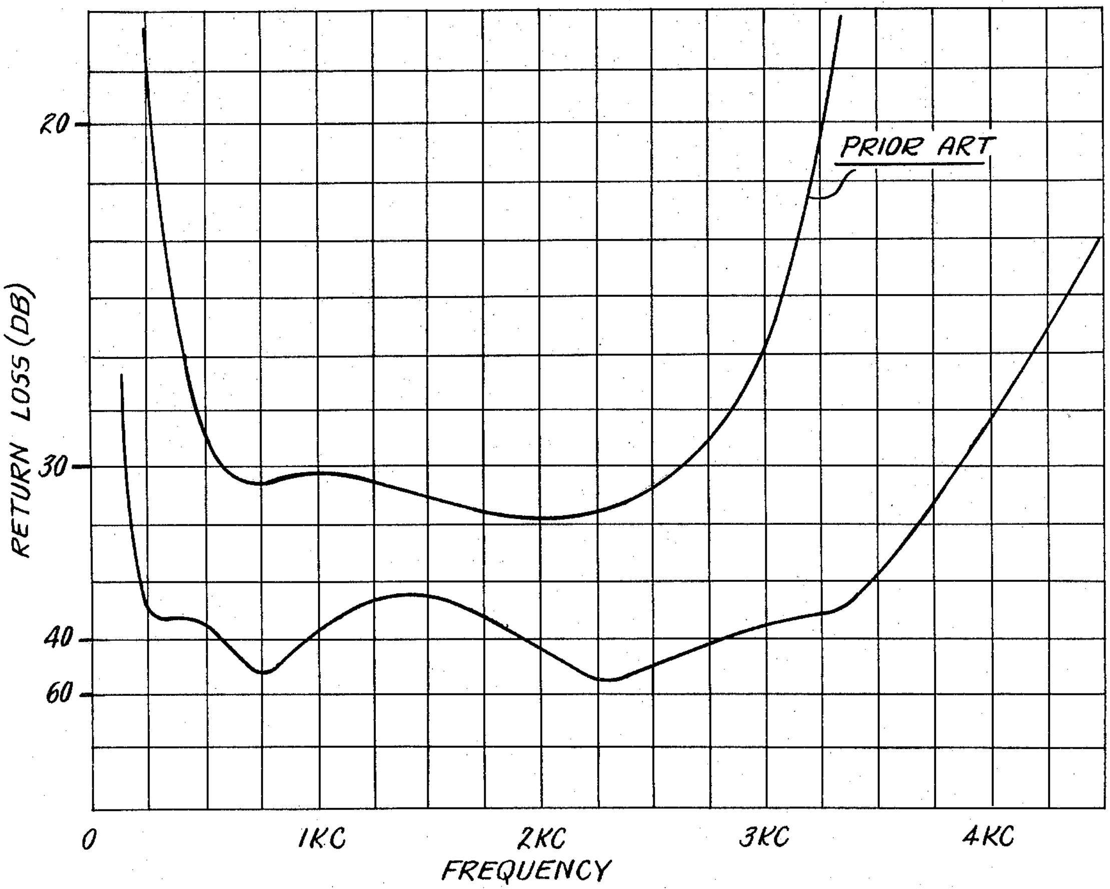
FIGS. 5 and 6 are performance curves of prior art devices in comparison with the present invention.
Figure 6:
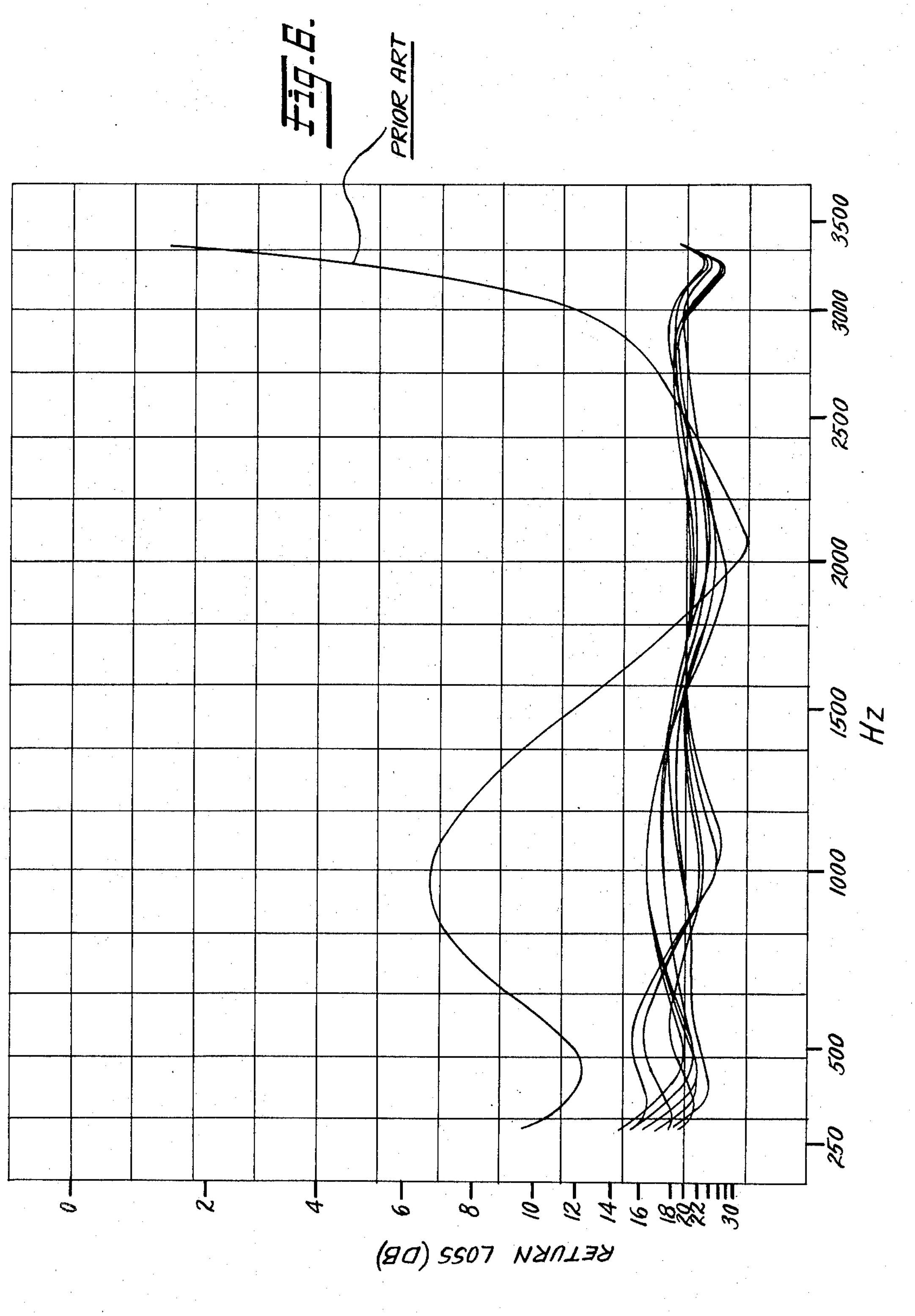

The performance characteristics of the instant invention will be appreciated from FIGS. 5 and 6 which compare the invention just described with the prior art.

The return loss measured in decibels versus the frequency is illustrated in FIG. 5. The top curve, representing the prior art, shows that at about 0.3 kc the return loss is about 25 decibels as compared to close to 40 decibels for the above described invention. At the comparison point of 3 kc the prior art is also at about 25, while the instant circuit is close to 40 decibels. The prior art has its highest decibel rating at under 35 decibels at 2 kc. This is still much below the lowest rating obtained by the instant invention with the commonly used bandwidth. FIG. 5 further illustrates excellent performance over a much wider bandwidth than the prior art and a higher overall performance.

One of the significant features of the instant invention is illustrated in FIG. 6 wherein the return loss of a number of repeaters in accordance with the instant invention is compared against the typical prior art repeater. The prior art curve shows that the return loss characteristic varies greatly over the audio frequency range, thus causing greater possibility of singing for example at two places, i.e., just under 1,000 Hz and just above 3,000 Hz. It will be noted that the curves of the typical device according to the instant invention have relatively uniform return loss over the same frequencies thus greatly minimizing possibility of singing.

It has been found that the invention has provided a significant improvement in the area of the return losses obtained at high gains. Return losses must be better at higher gain because reflection will cause oscillation, i.e., singing.

While one embodiment of the invention has been described, it will be understood that it is capable of many further modifications and this application is intended to cover any variations, uses, or adaptions of the invention following in general, the principles of the invention and including such departures from the present disclosure as come within knowledge or customary practice in the art to which the invention pertains, and as may be applied to the essential features hereinabove set forth and fall within the scope of the invention or the limits of the appended claims.

We claim:

1. A negative impedance repeater comprising:

a. a connecting transformer;

b. a separate, distinct series converter and a separate, distinct shunt converter each connected to said connecting transformer;

c. said converters each having a plurality of amplifying semiconductor means; and d. a biasing circuit for said semiconductor means, a portion of said biasing circuit being common to the semiconductor means in both of said converters.

2. A negative impedance repeater as defined in claim 1 wherein said common portion of the biasing circuit means includes a plurality of resistors.

3. A negative impedance repeater as defined in claim 1 including semiconductor overvoltage protection means for said semiconductors.

4. A negative impedance repeater as defined in claim 3 wherein said protection means are zener diodes.

5. A negative impedance repeater as defined in claim 1 including means for setting the gain on at least one of said converters, said setting means including a plurality of resistors which are either "on" or "off".

6. A negative impedance repeater as defined in claim 1 including a line build-out matching network connected to said transformer means.

7. A negative impedance repeater as defined in claim 6, said network including a low-frequency corrector, a high frequency corrector connected to said low-frequency corrector, said high-frequency corrector connected to an output, and variable build-out capacitance and resistance means connected to said output.

8. A negative impedance repeater as defined in claim 7 including a build-out transformer connecting said build-out capacitance and resistance means to said output.

9. A negative impedance repeater as defined in claim 7 wherein said variable capacitance and resistance means include a plurality of capacitors and resistors respectively, and a two-state switch connecting each of said capacitors and resistors into the output.

10. A negative impedance repeater as defined in claim 7 wherein said low-frequency corrector includes a shunt circuit having a fixed capacitor, a plurality of resistor circuit means and inductor circuit means which can be switched into said shunt circuit.

11. A negative impedance repeater as defined in claim 7 wherein said high-frequency corrector includes a first capacitance and a second capacitance and means for switching said second capacitance in and out of the high-frequency corrector circuit.

12. A negative impedance repeater as defined in claim 6 wherein said converters and said matching network are mounted on a single panel, and wherein essentially only capacitive, inductive and switching elements are mounted separately thereon, the remainder of the circuitry formed in integrated circuit form.

13. A line build-out network comprising:

a. a pair of input terminals;

b. a low-frequency corrector connected across said input terminals;

c. a coupling transformer including a separate primary winding connected to each one of said input terminals;

d. a build-out transformer including a plurality of windings;

e. a variable build-out capacitance and a variable build-out resistance wherein said variable capacitance is connected to said separate primary windings through first and second windings of said build-out transformer, said variable capacitance is connected to said output terminals through third and fourth windings of said build-out transformer and said variable resistance is coupled to both said separate primary windings and said output terminals through a fifth winding of said buildout transformer; ,and, f. a high frequency corrector including a secondary winding of said coupling transformer, said corrector coupled to said input terminals through said coupling transformer.

14. A line build-out network as defined in claim 13 wherein said variable capacitance and resistance each include a plurality of capacitors and resistors respectively, and a two-state switch connecting each of said capacitors and resistors to said output.

15. A line build-out network as defined in claim 13 wherein said low-frequency corrector includes a shunt circuit having a fixed capacitor, a plurality of resistor circuit means and inductor circuit means which can be switched into said shunt circuit.

16. A line build-out network as defined in claim 13 wherein said high-frequency corrector includes a first capacitance and a second capacitance and means for switching said second capacitance in and out of the high-frequency corrector circuit.

* * * * *